(12) United States Patent
Zhang et al.

(10) Patent No.: US 9,014,099 B2
(45) Date of Patent: Apr. 21, 2015

(54) PACKET SWITCHED DOMAIN SERVICE PROCESSING METHOD AND DEVICE

(75) Inventors: Fen Zhang, Shenzhen (CN); Kai Chen, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 121 days.

(21) Appl. No.: 13/988,041

(22) PCT Filed: Sep. 22, 2011

(86) PCT No.: PCT/CN2011/080000
§ 371 (c)(1),
(2), (4) Date: May 17, 2013

(87) PCT Pub. No.: WO2012/065475
PCT Pub. Date: May 24, 2012

(65) Prior Publication Data
US 2013/0235841 A1    Sep. 12, 2013

(30) Foreign Application Priority Data

Nov. 19, 2010    (CN) .......................... 2010 1 0552442

(51) Int. Cl.
*H04W 4/00*     (2009.01)
*H04W 72/04*    (2009.01)
*H04W 76/02*    (2009.01)

(52) U.S. Cl.
CPC ................ *H04W 72/04* (2013.01); *H04W 4/00* (2013.01); *H04W 76/025* (2013.01)

(58) Field of Classification Search
CPC ...................................................... H04W 72/04
USPC ................... 370/328–339, 342, 356; 455/435
See application file for complete search history.

(56) References Cited

U.S. PATENT DOCUMENTS

| 7,907,541 | B2 | 3/2011 | Lindstrom et al. | |
| 2009/0201823 | A1* | 8/2009 | Minerva et al. | 370/252 |
| 2011/0194498 | A1* | 8/2011 | Qin et al. | 370/328 |
| 2012/0201243 | A1 | 8/2012 | Wen et al. | |

FOREIGN PATENT DOCUMENTS

| CN | 101248685 | 8/2008 |
| CN | 101674308 | 3/2010 |
| CN | 102014499 | 4/2011 |
| KR | 20080072304 | 8/2008 |

OTHER PUBLICATIONS

International Search Report for PCT/CN2011/080000, English translation attached to original, Both completed by the Chinese Patent Office on Nov. 28, 2011, All together 7 Pages.

\* cited by examiner

*Primary Examiner* — Iqbal Zaidi
(74) *Attorney, Agent, or Firm* — Brooks Kushman P.C.

(57) ABSTRACT

A packet switched domain service processing method and device. The method is applied to a mobile terminal and includes allocating a plurality of Packet Data Protocol (PDP) link resources to a plurality of Packet Switched (PS) domain services, and using a plurality of PS domain services transmitting data on the PDP link resources allocated thereto, in order to improve data transmission rate.

8 Claims, 4 Drawing Sheets

PACKET SWITCHED DOMAIN SERVICE PROCESSING METHOD AND DEVICE

CROSS-REFERENCE TO RELATED APPLICATION

This application is the U.S. national phase of PCT Application No. PCT/CN2011/080000 filed on Sep. 22, 2011, which claims priority to Chinese Patent Application No. 201010552442.9 filed on Nov. 19, 2010, the disclosures of which are incorporated in their entirety by reference herein.

TECHNICAL FIELD

The present document relates to the field of communication, and specifically, to a method and device for processing packet switch domain services.

BACKGROUND OF THE RELATED ART

Currently, applications of Packet Switch (PS) domain services are more and more extensive. Before a user initiates a PS domain service data request, a Packet Data Protocol (PDP) link is required to be activated, and after the activation is successful, the services can perform data transmission on this link. The related technology relevant contents will be described below.

A PDP context saves all information of a user plane for which tunnel forwarding is performed, which includes an Internet Protocol (IP) address of the user plane of Radio Network Controller (RNC)/Gateway General Packet Radio Service Supporting Node (GGSN), a tunnel identifier and Quality of Service (QoS) and so on. PDP context activation request message contains a Network Layer Service Access Point Identifier (NSAPI) used for identifying a Protocol data unit (PDU), a PDP type, a PDP address, an Access Point Name (APN) and the QoS, and after the activation is successful, response message from a network side will be received and it contains a PDP context address and the QoS. The flow of PDP context activation is a process of establishing a packet transmission route of the user plane.

A secondary activation only can be initiated when PDP contexts are activated on the same PDP address and APN. With regard to the PDP context of the secondary activation and the activated PDP context, only QoS is different. With regard to all PDP contexts with the same PDP address, they are identified with a unique Traffic Flow Template (TFT) and NSAPI, each PDP context may only be related to one TFT, and only one PDP context is permitted to have no related TFT. When downlink data transmission is performed, the GGSN matches and selects appropriate PDP contexts according to the TFT, and when uplink data are transmitted, a User Equipment or a Mobile Station (MS) selects different PDP contexts according to the QoS.

In addition to the PDP activation and the secondary activation, there is still a network side activation, but there is generally no network side activation in the PS domain services at the present.

A PDP deactivation is to remove the activated PDP links, and it is required to initiate the PDP deactivation when the services exit.

In the related art, there are two ways used for the PDP activation, in way 1, when a service initiates an activation request, firstly the PDP links activated by a previous application are deactivated, and then the PDP activation is reactivated, in such a processing way, the data services cannot be sent concurrently; in way 2, a service initiated later and a previous service share a link, in such a processing way, multiple services are borne on one link, the data transmission efficiency is low, which will effect certain services with high QoS requirements and low delay. Therefore, all the ways used for the PDP activation in the related art have problems, thereby influencing the user experience.

SUMMARY OF THE INVENTION

The present document provides a method and device for processing packet switch domain services, to at least solve the above problems.

According to one aspect of the present document, a method for processing Packet Switch (PS) domain services is provided which is applied to a mobile terminal, and the method comprises: allocating multiple Packet Data Protocol (PDP) link resources to multiple PS domain services; and the multiple PS domain services performing data transmission on the PDP link resources allocated to the multiple PS domain services.

Preferably, allocating the multiple PDP link resources to the multiple PS domain services comprises: according to a PS domain service type, determining a way of allocating PDP link resources to the PS domain service type, wherein, the way of allocating PDP link resources is one of the following: allocating a new PDP link resource to the PS domain services, initiating a secondary activation request of activated PDP link resources to a network side to establish a new PDP link resource, or setting the PS domain services to share the activated PDP link resources.

Preferably, allocating a new PDP link resource to the PS domain services comprises at least one of the following: associating the activated PDP link resources, and initiating the secondary activation request of the activated PDP link resources to the network side to establish a new PDP link resource.

Preferably, allocating the multiple PDP link resources to the multiple PS domain services comprises: one of the multiple PS domain services sending PDP activation request message, wherein, the PDP activation request message carries identity information; and in a condition that no PDP link resource corresponding to the identity information exists in the activated PDP link resources, allocating a new PDP link resource to the PS domain service sending the PDP activation request message.

Preferably, in a condition that a first PDP link resource corresponding to the identity information exists in the activated PDP link resources, a secondary activation request of the first PDP link resource is initiated to the network side to establish a new PDP link resource for the PS domain service sending the PDP activation request message; or the PS domain service sending the PDP activation request message is set to share the first PDP link resource.

Preferably, in a condition that the PS domain service sending the PDP activation request message has a high requirement on Quality of Service (QoS) and/or delay, the secondary activation request of the first PDP link resource is initiated to the network side to establish a new PDP link resource for the PS domain service sending the PDP activation request message; and in a condition that the PS domain service sending the PDP activation request message has a low requirement on Quality of Service (QoS) and/or delay, the PS domain service sending the PDP activation request message is set to share the first PDP link resource.

Preferably, the above method further comprises: initiating a PDP link resource deactivation request; in a condition that deactivated PDP link resources have no associated link and bear only one service, initiating a deactivation request to the network side; and in a condition that the deactivated PDP link resources have associated links or the deactivated PDP link resources have shared services, saving the deactivation request, and after the deactivation request of the associated links is received or all the shared services exit, re-initiating the deactivation request to the network side.

According to another aspect of the present document, a device for processing Packet Switch (PS) domain services is further provided which is located in a mobile terminal, and the device comprises: an allocation module, configured to allocate multiple Packet Data Protocol (PDP) link resources to multiple PS domain services; and a transmission module, configured to make the multiple PS domain services perform data transmission on the PDP link resources allocated to the multiple PS domain services.

Preferably, the allocation module is configured to: according to a PS domain service type, determine a way of allocating PDP link resources to the PS domain service type, wherein, the way of allocating PDP link resources is one of the following: allocating a new PDP link resource to the PS domain services, initiating a secondary activation request of activated PDP link resources to a network side to establish a new PDP link resource, or setting the PS domain services to share the activated PDP link resources.

Preferably, the allocation module is configured to: in a condition that no PDP link resource corresponding to identity information exists in the activated PDP link resources, allocate a new PDP link resource to a PS domain service sending PDP activation request message, wherein, the identity information is carried in the PDP activation request message sent by one of the multiple PS domain services.

Through the present document, the problems existing in the PDP activation ways in the related art are solved, thereby improving the data transmission.

BRIEF DESCRIPTION OF DRAWINGS

Here, the described accompanying drawings are used to provide a further understanding of the present document and constitute a part of the present document. The schematic examples and illustrations thereof of the present document are used to explain the present document, but do not constitute an inappropriate limitation on the present document. In the drawings.

PREFERRED EMBODIMENTS OF THE INVENTION

The present document will be described in detail with reference to the accompanying drawings below and in combination with the examples below. It should be noted that the examples in the present document and the characteristics in the examples can be combined with each other in the condition of no conflict.

Figure 1:
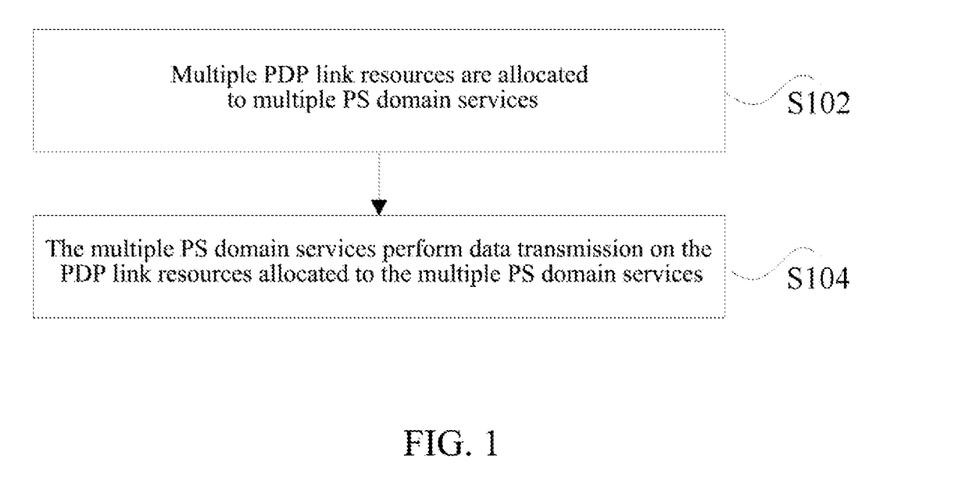
FIG. 1 is a flow diagram of a method for processing packet switch domain services according to the example of the present document.

FIG. 1 is a flow diagram of a method for processing Packet Switch (PS) domain services according to the example of the present document, the method is applied to a mobile terminal, and the flow includes the following steps.

In step S102, multiple Packet Data Protocol (PDP) link resources are allocated to multiple PS domain services.

In step S104, the multiple PS domain services perform data transmission on the PDP link resources allocated to the multiple PS domain services.

In the related art, no matter which PDP activation way is used, all the ways used are of single-link data transmission modes, thereby leading to a problem of slower transmission rate. Through the above steps, the multiple PDP link resources are used, thereby solving the problem in the related art and improving the transmission rate.

Preferably, during the implementation, a way of allocating PDP link resources to a PS domain service type can be determined according to the PS domain service type, wherein, the way of allocating PDP link resources is one of the following: allocating a new PDP link resource to the PS domain services, initiating a secondary activation request of the activated PDP link resources to a network side to establish a new PDP link resource, or setting the PS domain services to share the activated PDP link resources. Certainly, types of PS services will not be considered, once there is a new service request, a new PDP link resource is allocated to the service request. However, the way of allocating PDP link resources according to the PS domain service type can make the utilization rate of the PDP link resources higher.

Preferably, the following ways can be adopted to determine how to perform PDP link resource allocation.

For example, one of the multiple PS domain services sends PDP activation request message, wherein, the PDP activation request message includes identity information; and in the condition that no PDP link resource corresponding to the identity information exists in the activated PDP link resources, a new PDP link resource is allocated to the PS domain service sending the PDP activation request message.

Preferably, in the condition that a first PDP link resource corresponding to the identity information exists in the activated PDP link resources, a secondary activation request of the first PDP link resource is initiated to the network side to establish a new PDP link resource for the PS domain service sending the PDP activation request message; or the PS domain service sending the PDP activation request message is set to share the first PDP link resource. It should be noted that, "the first" in "the first PDP link resource" is just for a convenient description, and it has no practical significance.

It should be noted that, the secondary activation is required to associate with links of the primary activation due to requirements in the definition of the secondary activation, thus a module which is responsible for link management in the mobile terminal is required to know an association relationship between the secondary activation and the primary activation, and with regard to the services, it is not required to know whether the PDP link resources are allocated in the secondary activation or the PDP link resources are allocated in the primary activation.

Certainly, how to allocate the PDP link resources can be determined according to the QoS of the services. For example, in the condition that the PS domain service sending the PDP activation request message has a high requirement on Quality of Service (QoS) and/or delay, the secondary activation request of the first PDP link resource is initiated to the network side to establish a new PDP link resource for the PS domain service sending the PDP activation request message. For another example, in the condition that the PS domain service sending the PDP activation request message has a low requirement on Quality of Service (QoS) and/or delay, the PS domain service sending the PDP activation request message is set to share the first PDP link resource.

Preferably, the above identity information can be an Access Pont Name (APN).

After using the above ways of allocating the PDP link resources, the following deactivation ways can be adopted (but not limited to this).

A PDP link resource deactivation request is initiated; in the condition that the deactivated PDP link resources have no associated link and bear only one service, a deactivation request is initiated to the network side; and in the condition that the deactivated PDP link resources have associated links or the deactivated PDP link resources have shared services, the deactivation request is saved, and after the deactivation request of the associated links is received or all the shared services exit, the deactivation request is re-initiated to the network side.

Figure 2:
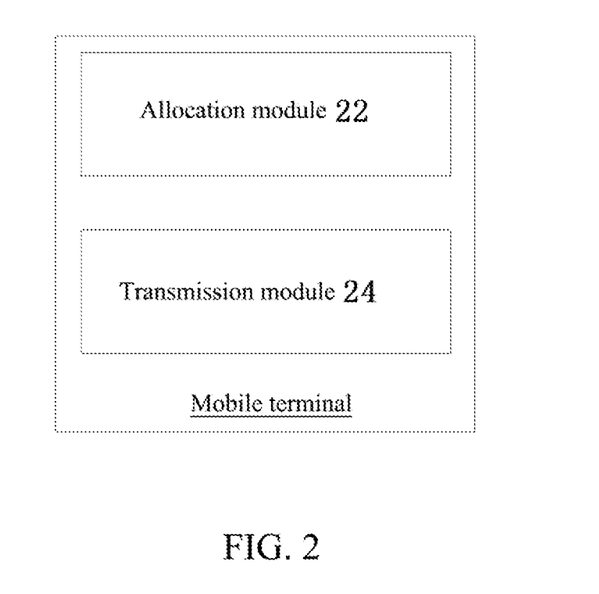
FIG. 2 is a block diagram of a structure of a device for processing packet switch domain services according to the example of the present document.

FIG. 2 is a block diagram of a structure of a device for processing Packet Switch (PS) domain services according to the example of the present document, and the device is located in a mobile terminal. The device is used for implementing the above example and preferred embodiments thereof, the contents which have be described will not be repeated, as shown in FIG. 2, the structure includes: an allocation module 22 and a transmission module 24, and the structure will be described below.

The allocation module 22 is used to: allocate multiple Packet Data Protocol (PDP) link resources to multiple PS domain services; and the transmission module 24 is used to: make the multiple PS domain services perform data transmission on the PDP link resources allocated to the multiple PS domain services.

Preferably, the allocation module 22 is used to: according to a PS domain service type, determine a way of allocating PDP link resources to the PS domain service type, wherein, the way of allocating PDP link resources is one of the following: allocating a new PDP link resource to the PS domain services, initiating a secondary activation request of the activated PDP link resources to a network side to establish a new PDP link resource, or setting the PS domain services to share the activated PDP link resources.

Preferably, the allocation module 22 is used to: in the condition that no PDP link resource corresponding to identity information exists in the activated PDP link resources, allocate a new PDP link resource to a PS domain service sending PDP activation request message, wherein, the identity information is carried in the PDP activation request message sent by one of the multiple PS domain services.

One preferred example of the present document will be described below, and it should be noted that the preferred example combines the above example and the preferred embodiments thereof. In the preferred example, a method and device for managing PS domain service concurrency are disclosed, and the method and device will be respectively described below.

The method for managing PS domain service concurrency includes: allocating Packet Data Protocol (PDP) link resources according to a PS domain service type; and when the services exit, initiating a PDP deactivation, and releasing the link resources.

Wherein, the method for managing PS domain service concurrency includes two parts, that is, link resource allocation and link resource recycling. In the link resource allocation, the PDP link resources will be rationally allocated according to a PS domain service type, AppID, which enables all the PS domain services to perform data transceiving concurrently.

For example, the link resources can be allocated according to an APN value of the service in the initiated PDP activation request message, if no requested APN exists in the currently activated links, a link resource NSAPI is allocated to new services, with APN and QoS information being added, and a request is sent to a network side to establish new links. If the APN in the PDP activation request message initiated by the service has existed in the activated links, the link resources are allocated according to service application types. For example, since session services or streaming services have higher requirements on QoS, they also have higher requirements on round trip delay, the link resources are allocated to this type of services, with the APN, QoS, the associated activated PDP links and TFT being added, and a secondary activation request is sent to the network side to establish new links. For example, with regard to an activation request initiated by interaction-type services or background-type services, a service itself does not has high requirements on QoS and delay, links with the same APN are directly found in the activated links and allocated to the service, that is, sharing the same link resource with other services.

Preferably, in the protocol, it is stipulated that network resources of each mobile terminal are limited (e.g. 11 links can be established at most), in the condition that the links have reached the maximum load, the new services cannot re-initiate the activation request any more and only can wait to attempt after other service release the link resources.

It continues to describe the initiation of PDP deactivation and the release of link resources when the services exit below.

A link initiating a PDP deactivation request is a link established in the secondary activation, the request can be directly sent to the network side, and network resources are released; a link initiating the PDP deactivation is a link established in the non-secondary activation, no link of the secondary activation is associated with that link, and the link bears only one service, and link resources are directly released; the link initiating the PDP deactivation is the link established in the non-secondary activation, and there exists a link of the secondary activation associated with that link at the same time, at the point, if the PDP deactivation is initiated, all links of the secondary activation associated with that link will also be deactivated simultaneously. In the preferred example, the method adopted is to record the deactivation request, but do not send the deactivation request to the network side. After all the links of the secondary activation associated with that link receive the deactivation request, PDP deactivation request message is initiated to the network side, link resources of the primary activation and link resources of the associated secondary activation are released simultaneously.

Preferably, the link initiating the PDP deactivation request is the link established in the non-secondary activation, there is no associated link of the secondary activation, but there are multiple services sharing the link resource, and the link resources also cannot be released at the point, thus, the service initiating the request can be recorded, until all the shared services exit and the deactivated is requested, the PDP deactivation request is initiated to the network side, and the network resources are released.

A device for managing packet data service concurrency is also provided in the preferred example, and with the device, a link resource management module (it is also called as a link management module, the module implements functions of the above allocation module 22 and other functions, which will be described below) is added into the mobile terminal. The module is responsible for link resource allocating during initiation of the services and for link recycling during exit of the services.

Figure 3:
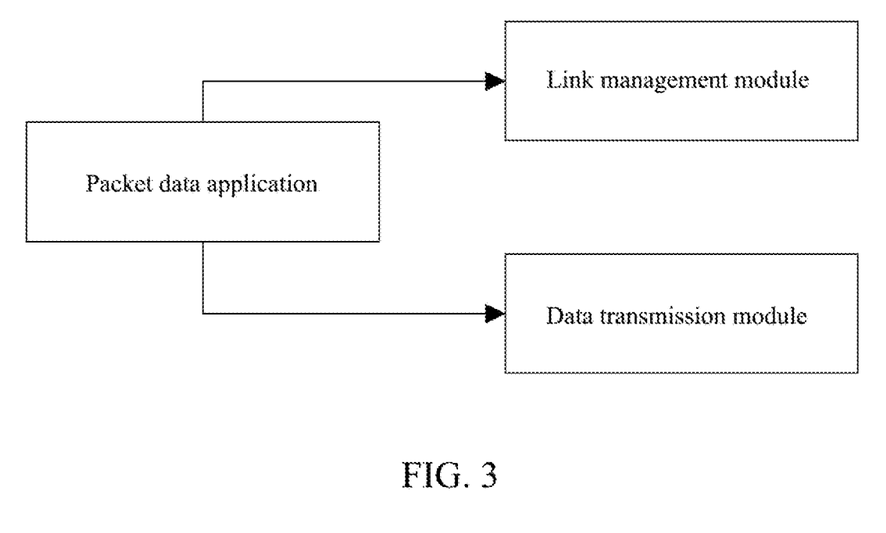
FIG. 3 is a preferred block diagram of a structure of a device for managing data service concurrency according to the example of the present document.

FIG. 3 is a preferred block diagram of a structure of a device for managing data service concurrency according to the example of the present document, and it should be noted that the device shown in FIG. 3 is directly applied in the mobile terminal. As shown in FIG. 3, the device includes a packet data application, a link management module and a data transmission module (the module implements functions of the above transmission module 24). Wherein, the link management module is responsible for allocating and recycling the link resources; the data transmission module is responsible for data transceiving applied to the network side; after the packet data application starts, it firstly sends a request to the link management module, the link management module allocates the link resources, establishes a packet link, and returns a result to the application, then the packet data application performs packet data transceiving through the data transmission module on the established link, before the application exits, the packet data application sends a resource release request to the link management module again, and the link management module is responsible for the final link recycling.

Figure 4:
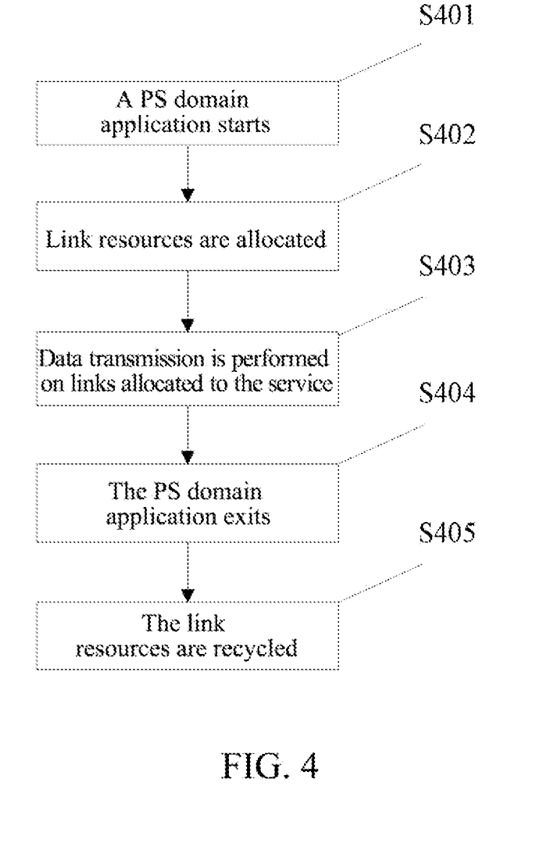
FIG. 4 is a flow diagram of data services starting and exiting of the mobile terminal according to the example of the present document.
Figure 5:
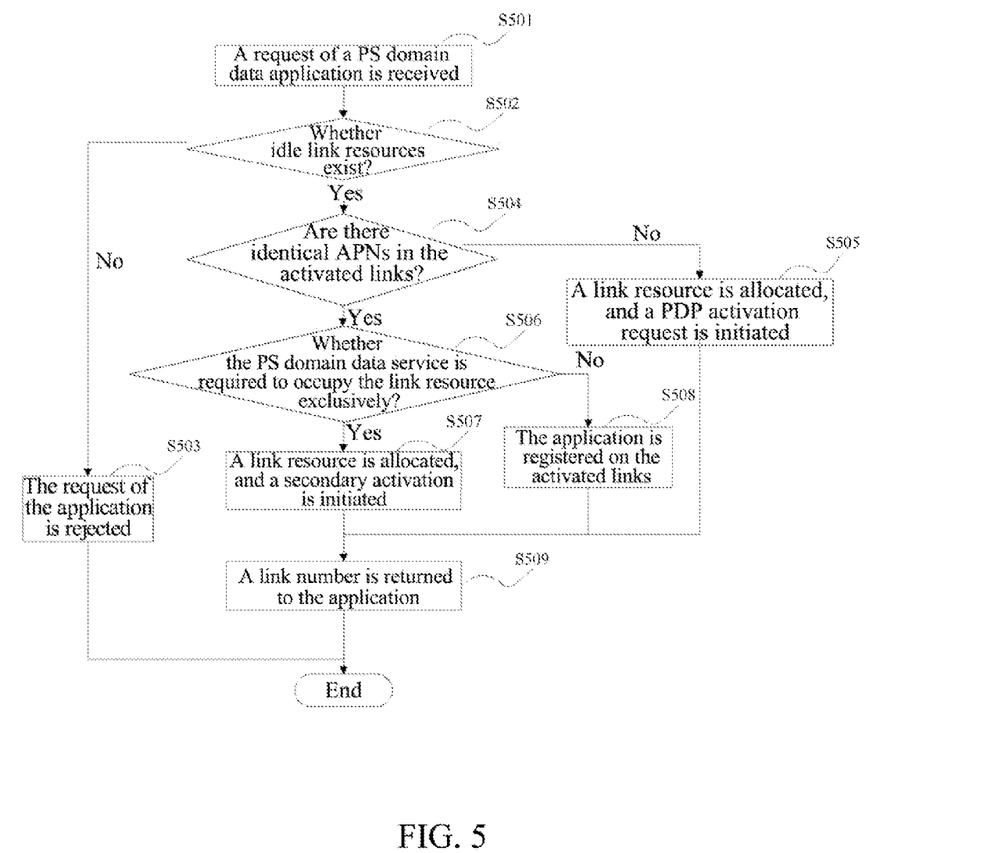
FIG. 5 is a flow diagram of a process for allocating link resources according to the example of the present document.
Figure 6:
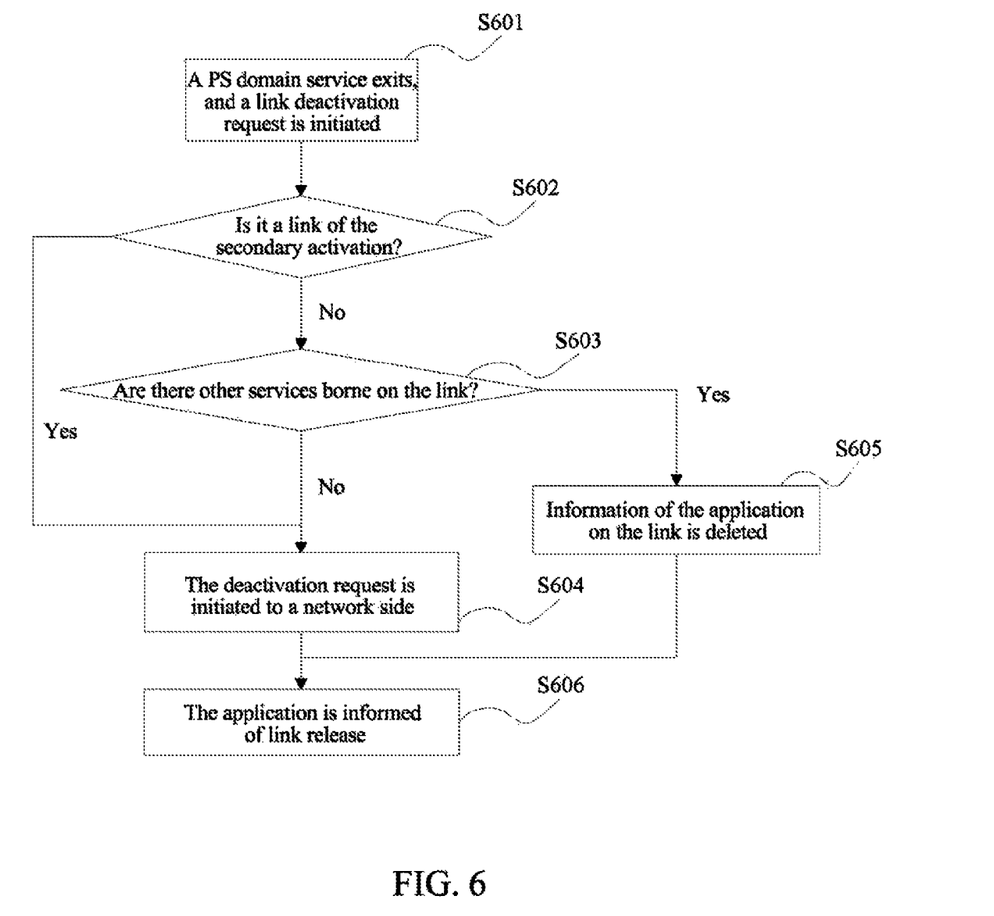
FIG. 6 is a flow diagram of a process for recycling link resources according to the example of the present document.

Descriptions are made in combination with the accompanying drawings 4, 5 and 6 below.

FIG. 4 is a flow diagram of data services starting and exiting of the mobile terminal according to the example of the present document, and as shown in FIG. 4, the flow includes the following steps.

In step S401, a mobile terminal triggers a PS domain application, since a majority of the data services such as multimedia message transceiving, webpage browse and streaming media on demand and so on are triggered by a terminal but not a network side, a PDP link activation is firstly initiated after the application starts, and the flow proceeds to step S402.

In step S402, a link resource is rationally allocated to the services, and an allocation policy is described as follows.

Firstly, a link is allocated according to an APN in a PDP request, and different links are allocated according to different APNs; secondly, when the APNs requested by the applications are identical, the previously established links can be shared or the secondary activation can be initiated on the activated links, and an allocation is based on types of services initiating the request; if the services initiating the request are session services or streaming services such as streaming media, this type of services have higher requirements on the transmission delay and have larger data volume, and thus higher QoS is required, if this type of services share the links with other applications, it will cause problems such as poor transmission quality and unsmooth play of the streaming media and so on. At the point, the secondary activation is initiated on the activated links, that is, a link source is re-allocated, the links of the secondary activation and the links of the primary activation associated with the links of the secondary activation have different QoSs and NSAPIs which are used for distinguishing uplink data streams, and the TFT distinguishes downlink data streams at the network side; with regard to a PDP link activation request initiated by interaction-type services or background-type services, since the QoS requirements are not high, it is not required to allocate new link resources, and the previously established links can be shared. After allocating the links to the applications through the above policy, the flow proceeds to step S403.

In step S403, the services perform data transmission on the allocated links. A PDP address, namely an IP address allocated by the network side to the terminal is obtained after the PDP activation, and the services perform data transceiving through a TCP/IP protocol.

In step S404, the PS domain applications exit, for example, multimedia message sending or receiving is finished, the user exits browsers and streaming media and so on, link resources need to be released, and the flow proceeds to step S405.

In step S405, the link resources are recycled, and a recycling policy is described as follows.

With regard to the links established in the secondary activation, the PDP deactivation can be initiated directly to recycle the link resources; with regard to the links of the primary activation, it is not only required to check whether there are associated links of the secondary activation but also required to judge whether there are other applications using the link; if there are associated links of the secondary activation or there exist other applications sharing the link, the PDP deactivation cannot be initiated to the network side, the application information can only be cancelled, until all the associated links of the secondary activation are deactivated and all the other sharing applications also initiate the deactivation, the deactivation is really initiated to the network side, and network resources are released.

The method for managing data service concurrency mainly includes two parts, i.e. link resource allocating and link resource recycling. The two parts will be respectively described below. FIG. 5 is a flow diagram of a process for allocating link resources according to the example of the present document, and as shown in FIG. 5, the flow includes the following steps.

In step S501, a PDP activation request initiated by a PS domain application is received, and the flow proceeds to step S502.

In step S502, it is to judge whether idle link resources exist. In the current protocol, it is stipulated that the number of available links of a mobile terminal is 11, if no idle link can be allocated, the flow proceeds to step S503, otherwise the flow proceeds to step S504.

In step S503, the request of the application is rejected, the application will not be able to establish PDP data links, and data transmission cannot be performed.

In step S504, APNs contained in the PDP activation request message sent from the application and APNs contained in the information of the activated links are compared, if there is no identical APN, the flow proceeds to step S505, otherwise the flow proceeds to step S506.

In step S505, an idle link is allocated, the APNs and QoS information are added, the PDP activation is initiated to a network side, an IP address allocated by the network side to the terminal is obtained after the activation is successful, and the flow proceeds to step S509.

In step S506, a type of the service sending the request is judged, if it is a session service or a streaming service, the flow proceeds to step S507, otherwise the flow proceeds to step S508.

In step S507, an idle link is allocated, information including APN, QoS, TFT and numbers of the activated links is added, a PDP secondary activation is initiated to the network side, and the flow proceeds to step S509 after the activation is successful.

In step S508, a new link is not allocated to a requesting application, the application will share links with other applications, at the point, information of the requesting application is registered on the links, and the flow proceeds to step S509.

In step S509, information of an allocated link including a link number and an IP address and so on is returned to the application.

FIG. 6 is a flow diagram of a process for recycling link resources according to the example of the present document, and as shown in FIG. 6, the flow includes the following steps.

In step S601, a PDP deactivation request initiated by a PS domain application is received, and the flow proceeds to step S602.

In step S602, it is to judge whether the link is a link of the secondary activation, if yes, the flow proceeds to step S604, otherwise the flow proceeds to step S603.

In step S603, it is to continue to judge whether information of other applications are also registered on the link, if not, the flow proceeds to step S604, otherwise the flow proceeds to step S605.

In step S604, the PDP deactivation request is initiated to a network side, and the request message is only required to contain a link number.

In step S605, the information of the application is canceled from the link. In step S606, the application is informed of the PDP deactivation completion and link release.

Through the above example, according to the requested APNs and service types of data services, link resource are rationally allocated and recycled, which enables multiple data services in the mobile terminal to perform data transceiving concurrently, and meanwhile guarantees that services such as session services and streaming services and so on which have higher requirements on the QoS and delay exclusively occupy the link resources, and ensures the service transmission quality. Services such as interaction-type services and background-type services and so on which have low requirements on the QoS and delay share the links to save the link resources, which makes the resources allocated rationally.

Apparently, the skilled in the art should understand that the modules or steps of the present document mentioned above can be implemented through a universal calculating device, and they can be concentrated on a single calculating device or distributed in a network consisting of multiple calculating devices. Alternatively, the modules or steps can be implemented through program codes which can be executed by the calculating device, thus, they can be stored in a storage device to be executed by the calculating device, and in some cases, the illustrated and described steps can be executed in a sequence different from here, or they can be made into multiple integrated circuit modules respectively, or multiple modules or steps of them can be made into a single integrated circuit module to be implemented. Therefore, the present document is not limited to any combination of hardware and software in a specific form.

The above description is only the preferred examples of the present document, which is not used to limit the present document. The present document can have various modifications and changes for the skilled in the art. All the modifications, equivalent substitutions, and improvements, etc. made within the spirit and principle of the present document shall fall into the protection scope of the present document.

What is claimed is:

1. A method for processing Packet Switch (PS) domain services, applied to a mobile terminal, comprising:
   allocating multiple Packet Data Protocol (PDP) link resources to multiple PS domain services;
   the multiple PS domain services performing data transmission on the PDP link resources allocated to the multiple PS domain services;
   wherein, allocating the multiple PDP link resources to the multiple PS domain services comprises:
   according to a PS domain service type, determining a way of allocating PDP link resources to the PS domain service type, wherein, the way of allocating PDP link resources is one of the following: allocating a new PDP link resource to the PS domain services, initiating a secondary activation request of activated PDP link resources to a network side to establish a new PDP link resource, or setting the PS domain services to share the activated PDP link resources;
   wherein, allocating the multiple PDP link resources to the multiple PS domain services comprises:
   one PS domain service of the multiple PS domain services sending PDP activation request message, wherein, the PDP activation request message carries identity information;
   in a condition that no PDP link resource corresponding to the identity information exists in the activated PDP link resources, allocating a new PDP link resource to the PS domain service sending the PDP activation request message;
   wherein, in a condition that a first PDP link resource corresponding to the identity information exists in the activated PDP link resources,
   a secondary activation request of the first PDP link resource is initiated to the network side to establish a new PDP link resource for the PS domain service sending the PDP activation request message; or
   the PS domain service sending the PDP activation request message is set to share the first PDP link resource;
   wherein,
   in a condition that the PS domain service sending the PDP activation request message has a high requirement on Quality of Service (QoS), the secondary activation request of the first PDP link resource is initiated to the network side to establish a new PDP link resource for the PS domain service sending the PDP activation request message;
   in a condition that the PS domain service sending the PDP activation request message has a low requirement on Quality of Service (QoS), the PS domain service sending the PDP activation request message is set to share the first PDP link resource.

2. The method according to claim 1, wherein, allocating a new PDP link resource to the PS domain services comprises at least one of the following:
   associating the activated PDP link resources, and initiating the secondary activation request of the activated PDP link resources to the network side to establish a new PDP link resource.

3. The method according to claim 2, further comprising:
   initiating a PDP link resource deactivation request;
   in a condition that deactivated PDP link resources have no associated link and bear only one service, initiating a deactivation request to the network side; and
   in a condition that the deactivated PDP link resources have associated links or the deactivated PDP link resources have shared services, saving the deactivation request, and after the deactivation request of the associated links is received or all the shared services exit, re-initiating the deactivation request to the network side.

4. The method according to claim 2, wherein, allocating the multiple PDP link resources to the multiple PS domain services comprises:

one PS domain service of the multiple PS domain services sending PDP activation request message, wherein, the PDP activation request message carries identity information;

in a condition that no PDP link resource corresponding to the identity information exists in the activated PDP link resources, allocating a new PDP link resource to the PS domain service sending the PDP activation request message.

5. A device for processing Packet Switch (PS) domain services, located in a mobile terminal, the device comprising at least one processor coupled to a memory for executing an allocation module and a transmission module, wherein:

the allocation module is configured to allocate multiple Packet Data Protocol (PDP) link resources to multiple PS domain services;

the transmission module is configured to make the multiple PS domain services perform data transmission on the PDP link resources allocated to the multiple PS domain services;

wherein, allocating the multiple PDP link resources to the multiple PS domain services comprises:

according to a PS domain service type, determining a way of allocating PDP link resources to the PS domain service type, wherein, the way of allocating PDP link resources is one of the following: allocating a new PDP link resource to the PS domain services, initiating a secondary activation request of activated PDP link resources to a network side to establish a new PDP link resource, or setting the PS domain services to share the activated PDP link resources;

wherein, allocating the multiple PDP link resources to the multiple PS domain services comprises:

one PS domain service of the multiple PS domain services sending PDP activation request message, wherein, the PDP activation request message carries identity information;

in a condition that no PDP link resource corresponding to the identity information exists in the activated PDP link resources, allocating a new PDP link resource to the PS domain service sending the PDP activation request message;

wherein, in a condition that a first PDP link resource corresponding to the identity information exists in the activated PDP link resources, a secondary activation request of the first PDP link resource is initiated to the network side to establish a new PDP link resource for the PS domain service sending the PDP activation request message; or the PS domain service sending the PDP activation request message is set to share the first PDP link resource;

wherein, in a condition that the PS domain service sending the PDP activation request message has a high requirement on Quality of Service (QoS), the secondary activation request of the first PDP link resource is initiated to the network side to establish a new PDP link resource for the PS domain service sending the PDP activation request message;

in a condition that the PS domain service sending the PDP activation request message has a low requirement on Quality of Service (QoS), the PS domain service sending the PDP activation request message is set to share the first PDP link resource.

6. The device according to claim 5, wherein, the allocation module is configured to: according to a PS domain service type, determine a way of allocating PDP link resources to the PS domain service type, wherein, the way of allocating PDP link resources is one of the following: allocating a new PDP link resource to the PS domain services, initiating a secondary activation request of activated PDP link resources to a network side to establish a new PDP link resource, or setting the PS domain services to share the activated PDP link resources.

7. The device according to claim 6, wherein the allocation module is configured to: in a condition that no PDP link resource corresponding to identity information exists in the activated PDP link resources, allocate a new PDP link resource to a PS domain service sending PDP activation request message, wherein, the identity information is carried in the PDP activation request message sent by one PS domain service of the multiple PS domain services.

8. The device according to claim 5, wherein, the allocation module is configured to: in a condition that no PDP link resource corresponding to identity information exists in the activated PDP link resources, allocate a new PDP link resource to a PS domain service sending PDP activation request message, wherein, the identity information is carried in the PDP activation request message sent by one PS domain service of the multiple PS domain services.

* * * * *